(12) United States Patent
Hafner et al.

(10) Patent No.: US 8,086,486 B2
(45) Date of Patent: Dec. 27, 2011

(54) METHOD FOR MANAGING INFORMATION AND RENDERING DISCOUNTS

(75) Inventors: Chase A. Hafner, Westminster, CO (US); William R. Mutschler, Arvada, CO (US); Brian J. Walker, Westminster, CO (US); David S. Joyce, Lakewood, CO (US)

(73) Assignee: Qwest Communications International Inc., Denver, CO (US)

( * ) Notice: Subject to any disclaimer, the term of this patent is extended or adjusted under 35 U.S.C. 154(b) by 1514 days.

(21) Appl. No.: 11/505,621

(22) Filed: Aug. 16, 2006

(65) Prior Publication Data
US 2007/0043618 A1 Feb. 22, 2007

Related U.S. Application Data

(63) Continuation of application No. 09/421,038, filed on Oct. 20, 1999, now abandoned.

(51) Int. Cl.
G06Q 30/00 (2006.01)
G06F 17/30 (2006.01)
H04M 15/00 (2006.01)

(52) U.S. Cl. ............... 705/14.1; 705/14.17; 379/114.03; 379/114.12; 707/773

(58) Field of Classification Search .................. 705/14.1, 705/14.17; 379/114.03, 114.12; 707/773
See application file for complete search history.

(56) References Cited

U.S. PATENT DOCUMENTS

| 5,003,584 | A | 3/1991 | Benyacar et al. |
| 5,915,006 | A | 6/1999 | Jagadish et al. |
| 6,415,298 | B1 * | 7/2002 | Oesterer et al. ........................ 1/1 |
| 2001/0017915 | A1 | 8/2001 | Wardin et al. |
| 2007/0043618 | A1 * | 2/2007 | Hafner et al. ................... 705/14 |

OTHER PUBLICATIONS

Definition of "engine", Microsoft Press Computer Dictionary, 3rd Ed. (Microsoft Press, Redmond, Washington, 1997).*
Welt, Sabina, "Kenan Systems Corporation unveils industry's first strategic billing software with customer analysis capability", Business Wire, Apr. 22, 1996.*
U.S. Appl. No. 10/095,415, BPAI Decision dated Jun. 16, 2006, 15 pgs.
U.S. Appl. No. 10/095,415, Examiner's Answer to Appeal Brief dated Oct. 31, 2006, 10 pgs.
U.S. Appl. No. 10/095,415, Advisory Action dated Jun. 15, 2005, 3 pgs.
U.S. Appl. No. 10/095,415, Final Rejection dated Mar. 3, 2005, 8 pgs.
U.S. Appl. No. 10/095,415, BPAI Decision dated Sep. 7, 2004, 13 pgs.
U.S. Appl. No. 10/095,415, Examiner's Answer to Appeal Brief dated Jan. 13, 2003, 5 pgs.
U.S. Appl. No. 10/095,415, Examiner's Answer to Appeal Brief dated Nov. 8, 2002, 9 pgs.
U.S. Appl. No. 10/095,415, Advisory Action dated May 30, 2002, 3 pgs.
U.S. Appl. No. 10/095,415, Final Rejection dated Mar. 29, 2002, 7 pgs.
U.S. Appl. No. 10/095,415, Office Action dated Oct. 24, 2001, 9 pgs.

(Continued)

*Primary Examiner* — Donald L. Champagne (57) ABSTRACT

A method for managing information and rendering discounts in a billing system utilizes a rule-based engine. Customer records are processed with a rule-based accumulation engine to accumulate the data in a plurality of predetermined target accumulators. A plurality of target accumulators are processed with a rule-based discount engine to render discounts applicable to the customer.

13 Claims, 7 Drawing Sheets

OTHER PUBLICATIONS

Definition of "configure", Merriam-Webster's Online Dictionary, accessed Feb. 25, 2005 at http://www.search.eb.com/dictionary.
Definitions of "configuration" and "configuration file", Microsoft Press Computer Dictionary, Third Ed. (Redmond, Washington; Microsoft Corp., 1997).
U.S. Appl. No. 09/421,038, BPAI Decision dated Jun. 16, 2006, 15 pgs.
U.S. Appl. No. 09/421,038, Examiners Answer to Appeal Brief dated Oct. 31, 2005, 10 pgs.
U.S. Appl. No. 09/421,038, Advisory Action dated Jun. 15, 2005, 3 pgs.
U.S. Appl. No. 09/421,038, Final Rejection dated Mar. 3, 2005, 8 pgs.
U.S. Appl. No. 09/421,038, BPAI Decision dated Sep. 7, 2004, 13 pgs.
U.S. Appl. No. 09/421,038, Examiners Answer to Appeal Brief dated Nov. 8, 2002, 9 pgs.
U.S. Appl. No. 09/421,038, Advisory Action dated May 30, 2002, 3 pgs.
U.S. Appl. No. 09/421,038, Final Rejection dated Mar. 29, 2002, 7 pgs.
U.S. Appl. No. 09/421,038, Office Action dated Oct. 24, 2001, 9 pgs.

* cited by examiner

METHOD FOR MANAGING INFORMATION AND RENDERING DISCOUNTS

This is a continuation of application(s) Ser. No. 09/421,038 filed on Oct. 20, 1999 now abandoned.

TECHNICAL FIELD

The present invention relates to a method for managing information and rendering discounts in a billing system.

BACKGROUND ART

In many lines of business, and particularly in the telecommunications industries, managing information for a large number of customers may become quite complicated. Further, customer bills are often adjusted by various discounts. Applying the discounts to the bills, particularly in the telecommunications industries, may quickly become complicated due to the large number of customers and the large amounts of data for each customer during a particular billing period.

In an existing method for rendering discounts, a complex application specific software package is developed to render discounts in a particular billing system having a highly defined structure. The application specific software package is developed for a single company to use for their customers, and is tailored to meet the specific needs of that company. As such, developing a discount rendering software package is expensive, and takes a lot of time. As such, it is not feasible to change the way in which discounts are rendered very often, because the software package is so application specific that it is sometimes necessary to develop an entire new application specific software package in order to revise the discount rendering technique. Further, because the package generally is implemented for use with a highly defined billing structure, these applications are generally not usable by others than the company that the particular package is designed for.

For the foregoing reasons, there is a need for a method for managing information and rendering discounts in a billing system that is more easily modified and may be ported to different platforms without excessive difficulties.

DISCLOSURE OF INVENTION

It is, therefore, an object of the present invention to provide a method for managing information and rendering discounts in a billing system that utilizes a rule-based engine configured to accumulate data and render discounts.

In carrying out the above object, a method for managing information and rendering discounts in a billing system is provided. The method comprises receiving a record including data, establishing a rule-based accumulation engine, and processing the record. The record is processed with the accumulation engine to accumulate the data in a plurality of predetermined target accumulators. The method further comprises establishing a rule-based discount engine, and processing the plurality of target accumulators. The plurality of target accumulators are processed with the discount engine to render discounts applicable to the customer.

In a preferred embodiment, the record has a record type and establishing the accumulation engine further comprises establishing a rule table that directs the accumulation engine based on the record type. Further, preferably, at least one rule is established for processing a record by performing a sequence of operations to the data, with the rules table directing the accumulation engine to apply the at least one rule when dictated by the record type. Still further, preferably, at least one function is established for processing a record, with the rules table directing the accumulation engine to apply the at least one function when dictated by the record type. Even further, preferably, the rules table directs the accumulation engine to pass the data directly to a target accumulator when dictated by the record type.

In a preferred embodiment, the record includes at least one source field, and receiving the record further comprises assigning a logical name to a source field. The accumulation engine processes is the record using the logical name. As such, the accumulation and discount engines are not limited by the format of incoming data, because logical names are assigned to incoming data source fields to place the data in a standard format for the rules-based engines.

In one implementation, establishing the discount engine further comprises establishing at least one rule for processing the record to evaluate discount qualification and at least one rule for processing the record to evaluate discount applications. Further, in one implementation, establishing the discount engine further comprises establishing at least one simple rule for processing the record. Still further, establishing the discount engine preferably further comprises establishing at least one compound rule for processing the record. The at least one compound rule is composed of a plurality of simple rules, with the discount engine applying the compound rule by recursively applying simple rules.

Further, in carrying out the present invention, a discount system for managing information and rendering discounts in a billing system is provided. The system comprises a rule-based engine configured to receive a customer record including data, and process the record to accumulate the data in a plurality of predetermined target accumulators. The rule-based engine is further configured to process the plurality of target accumulators to render discounts applicable to the customer.

Still further, in carrying out the present invention, a computer readable storage medium having information stored thereon representing instructions executable by a computer to manage information and render discounts in a billing system is provided. The computer readable storage medium further comprises instructions for receiving a customer record including data, instructions for establishing a rule-based accumulation engine, and instructions for processing the record with the accumulation engine to accumulate the data in a plurality of predetermined target accumulators. The computer readable storage medium further comprises instructions for establishing a rule-based discount engine, and instructions for processing the plurality of target accumulators with the discount engine to render discounts applicable to the customer.

In a preferred embodiment, the computer readable storage medium further comprises instructions for establishing a rules table and rules and functions that are applied as directed by the rules table as dictated by record type. Further, preferably, logical names are assigned to source fields. Still further, the computer readable storage medium further comprises instructions for evaluating discount qualification, and evaluating discount applications using simple rules and compound rules that are performed by recursive application simple rules.

The advantages associated with embodiments of the present invention are numerous. For example, embodiments of the present invention provide a method, system, and computer instructions for managing information and rendering discounts in a billing system that utilizes a rule-based engine to process the billing information. Advantageously, using a rule-based approach simplifies steps involved in changing the way discounts are applied and adding additional functionality. Further, preferred embodiments assign logical names to source data fields so that the rule-based engine or engines be ported to many different billing platforms without excessive difficulties. Advantageously, the present invention provides a rule-based engine for billing applications with far more flexibility than the non-rule-based application specific programs in the prior art.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
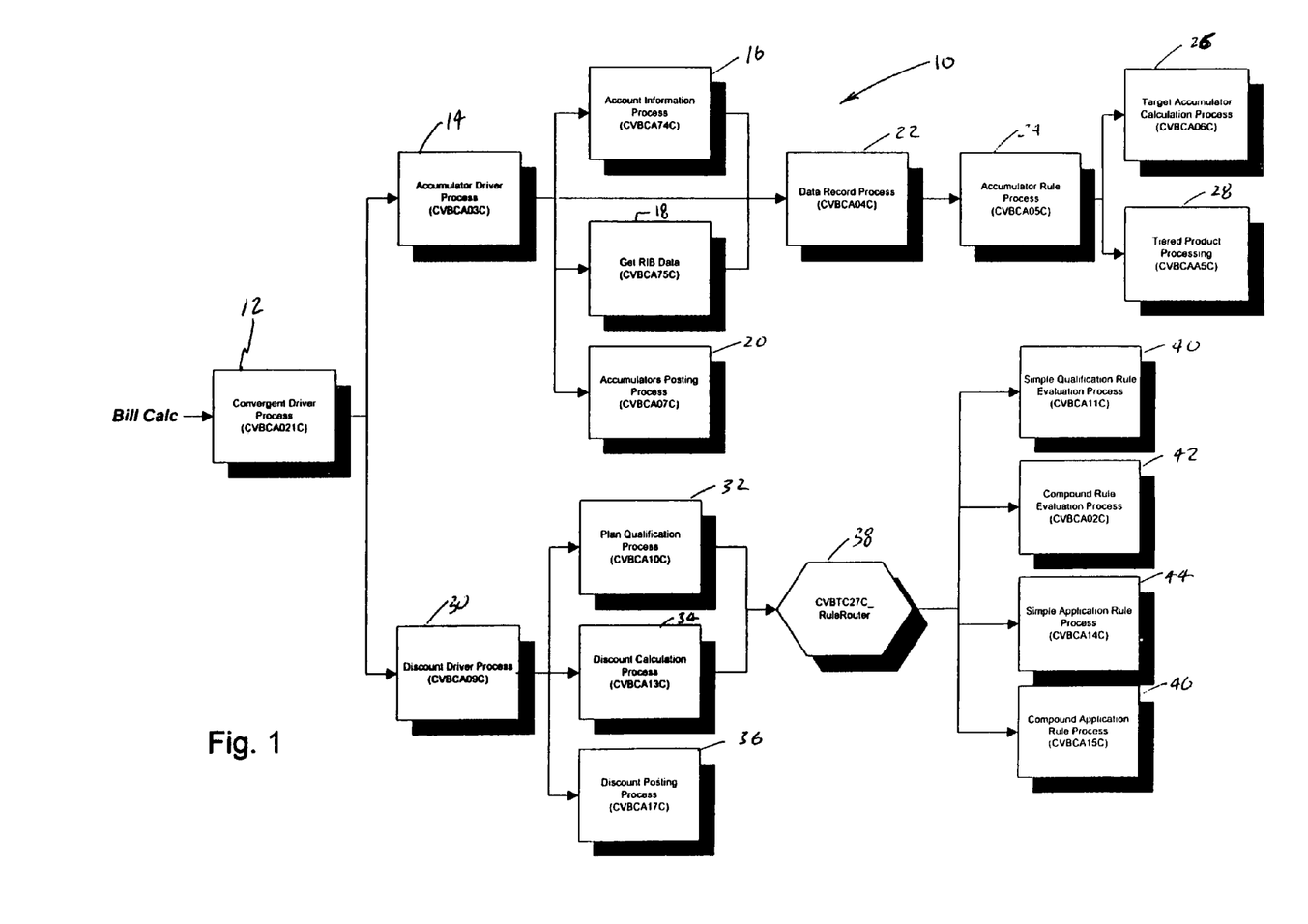
FIG. 1 illustrates a convergent discount engine made in accordance with the present invention utilizing a rule-based approach for managing information and rendering discounts.

With reference to FIG. 1, the high level block diagram of a system of the present invention is generally indicated at 10. As shown, the overall rule-based billing calculation is shown at convergent driver process 12. Convergent driver process 12 is composed of accumulator driver process 14 and discount driver process 30. Of course, it is appreciated by those skilled in the art that embodiments of the present invention may be implemented in a variety of different ways at the low level, and that the high level diagram shown in FIG. 1 is arranged to facilitate an understanding of the present invention. That is, record processing in accordance with the present invention uses a rule-based system. The rule-based system may be formed in a variety of ways, such as with essentially separate accumulator driver and discount driver processes. In the alternative, the accumulator driver process or engine and the discount processor engine may be formed as parts of a larger engine, such as an overall convergent driver processor engine.

Accumulator driver process 14 includes account information gathering process 16 and data gathering process 18, in addition to accumulator posting process 20. Account information and other data, such as data representing telecommunication services, are received as data records at data record process 22. These data records are processed by the accumulator engine at accumulator rule process 24. Processing includes target accumulator calculation process 26 and optionally includes tiered product processing 28.

Discount driver process 30 includes discount qualification process 32, discount calculation process 34, and discount posting process 36. Qualification and calculation are controlled by the rule router 38. Rule router 38, based on information in target accumulators, calls on simple qualification rule evaluation process 40, compound rule evaluation process 42, simple application rule process 44, and compound application rule process 46 to process the data and render discounts which are posted at discount posting process 36.

Figure 2:
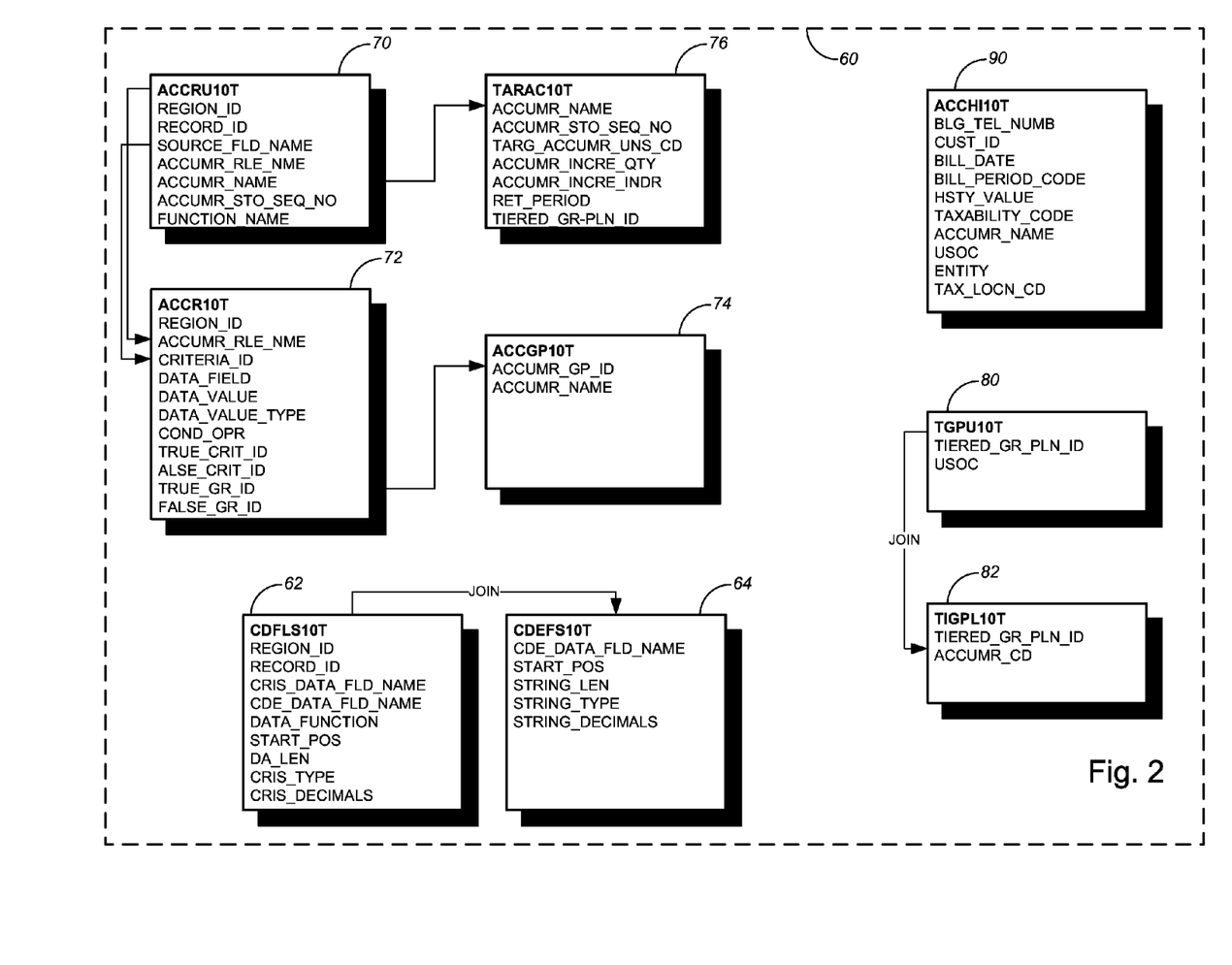
FIG. 2 depicts the interaction of data accumulation engine tables and their dependencies.

With reference to FIGS. 1 and 2, the accumulation side of the system will be described in further detail. A suitable application for embodiments of the present invention is in processing billing information in the telecommunications industries. As such, the examples used herein to illustrate the present invention are telephone billing records. However, embodiments of the present invention may be used in a number of different applications, and the rule-based information processing techniques of the present invention are not necessarily limited to the telecommunications industry.

As shown in FIG. 2, an accumulator engine 60, in one suitable implementation, receives data in any format at block 62. That is, data records may contain information, in any way because source fields within block 62 are assigned logical names at block 64. As such, the reformatted record of block 64 is processed by the accumulation engine. The reformatted record may be one of any number of different record types. When a customer record is received, an accumulator rules table 70 directs the engine to perform appropriate processing. One way for processing a record with the accumulation engine is to perform a sequence of operations to the data, as shown at accumulator criteria identifier block 72. At block 72, a target accumulator is determined. At block 74, a table interprets the target accumulator determined at block 72 and sends appropriate values to the target accumulators which are indicated at block 76. Although there are many techniques for the implementation of the accumulator engine at the lower level, some examples are given below. In the below reproduced tables, table "ACCRU10T" is rules table 70, table "ACCCR10T" is criteria rules block 72, table "ACCGP10T" is the group name map block 74. Target accumulators 76 are not reproduced in a table format herein.

| | | | ACCRU10T | | | | | | |
|---|---|---|---|---|---|---|---|---|---|
| Region | Rec Id | Source Field | Accmr-Rle-Nme | Accumr-Nme | Accmr-Sto_Seq_No | Function-Name | Ruls-Eff-Dat | Ruls-Dscntn-Dat | Lst-Updt-Dat |
| C | 210 | Call-Dur | R0000001 | | | | 998-02-2 | 2099-12-31 | 1998-02-23 |
| C | 210 | Msg-Chrg-Amt-Tot | R0000002 | | | | 998-02-2 | 2099-12-31 | 1998-02-23 |
| C | 220 | Call-Dur | R0000003 | | | | 998-02-2 | 2099-12-31 | 1998-02-23 |

-continued

| ACCRU10T | | | | | | | | | |
|---|---|---|---|---|---|---|---|---|---|
| Region | Rec Id | Source Field | Accmr-Rle-Nme | Accumr-Nme | Accmr-Sto_Seq_No | Function-Name | Ruls-Eff-Dat | Ruls-Dscntn-Dat | Lst-Updt-Dat |
| C | 220 | Msg-Chrg-Amt-Tot | R0000004 | | | | 998-02-2 | 2099-12-31 | 1998-02-23 |
| C | E810101M | BMD81-CHG | R0000005 | | | | 998-02-2 | 2099-12-31 | 1998-02-23 |
| C | E810101M | BMD81-BLBL-TM | R0000006 | | | | 998-02-2 | 2099-12-31 | 1998-02-23 |
| C | B61 | CRB-B61-LSJRC | | | | Tier_Prc | 998-02-2 | 2099-12-31 | 1998-02-23 |
| C | EI | UF-EI-CLSER | | TYPSRV | 85 | | 998-02-2 | 2099-12-31 | 1998-02-23 |
| C | EG | Tot-Curr-Amt-Excl-Tax | R0000007 | | | | 998-02-2 | 2099-12-31 | 1998-02-23 |

| ACCCR10T | | | | | | | | | | |
|---|---|---|---|---|---|---|---|---|---|---|
| Accmr-Rle-Nme | Criteria-Id | Data-Field | Operation | Value Type | Value | True Compare | False Compare | True-Accmr-Gr-Id | False-Accmr-Gr-Id | Comment |
| R0000001 | 001 | ENTY-CD | = | Char | MTN | 003 | 002 | | | Regulated? |
| | 002 | ENTY-CD | = | Char | MTT | 003 | 101 | | | |
| | 003 | MSG-TYP | = | Char | 1 | | | 1 | 2 | Direct Dialed? |
| | 101 | ENTY-CD | = | Char | MBU | 103 | 102 | | | Unregulated? |
| | 102 | ENTY-CD | = | Char | MTU | 103 | 201 | | | Error if No |
| | 103 | MSG-TYP | = | Char | 1 | | | 3 | 4 | Direct Dialed? |
| | 201 | ENTY-CD | = | Char | MTW | | | 22 | 9999 | LD USWC feed? |
| R0000002 | 001 | ENTY-CD | = | Char | MTN | 003 | 002 | | | Regulated? |
| | 002 | ENTY-CD | = | Char | MTT | 003 | 101 | | | |
| | 003 | MSG-TYP | = | Char | 1 | | | 5 | 6 | Direct Dialed? |
| | 101 | ENTY-CD | = | Char | MBU | 103 | 102 | | | Unregulated? |
| | 102 | ENTY-CD | = | Char | MTU | 103 | | | 9999 | Error if No |
| | 103 | MSG-TYP | = | Char | 1 | | | 7 | 8 | Direct Dialed? |
| | 201 | ENTY-CD | = | Char | MTW | | | 23 | 9999 | LD USWC feed? |
| R0000003 | 001 | ENTY-CD | = | Char | MTN | | 002 | 9 | | Regulated? |
| | 002 | ENTY-CD | = | Char | MTT | | 101 | 9 | | |
| | 101 | ENTY-CD | = | Char | MBU | | 102 | 10 | | Unregulated? |
| | 102 | ENTY-CD | = | Char | MTU | | | 10 | 9999 | Error if No |
| R0000004 | 001 | ENTY-CD | = | Char | MTN | | 002 | 11 | | Regulated? |
| | 002 | ENTY-CD | = | Char | MTT | | 101 | 11 | | |
| | 101 | ENTY-CD | = | Char | MBU | | 102 | 12 | | Unregulated? |
| | 102 | ENTY-CD | = | Char | MTU | | | 12 | 9999 | Error if No |
| R0000005 | 001 | SPLR-ID | = | Char | 0551 | | 002 | 13 | | Wireless? |
| | 002 | SPLR-ID | = | Char | 0718 | 003 | | | 9999 | LD? |
| | 003 | MSG-TYP | = | Char | 1 | 004 | 005 | | | Direct Dialed? |
| | 004 | RCD-ID-TYP | = | Char | 05 | | | 26 | 15 | Toll Free? |
| | 005 | MSG-TYP | = | Char | 3 | 006 | 007 | | | Calling Card? |
| | 006 | RCD-ID-TYP | = | Char | 05 | | | 16 | 27 | Toll Free? |
| | 007 | RCD-ID-TYP | = | Char | 05 | | | 28 | 17 | Toll Free? |
| R0000006 | 001 | SPLR-ID | = | Char | 0551 | | 002 | 18 | | Wireless? |
| | 002 | SPLR-ID | = | Char | 0718 | 003 | | | 9999 | LD? |
| | 003 | MSG-TYP | = | Char | 1 | 004 | 005 | | | Direct Dialed? |
| | 004 | RCD-ID-TYP | = | Char | 05 | | | 29 | 19 | Toll Free? |
| | 005 | MSG-TYP | = | Char | 3 | 006 | 007 | | | Calling Card? |
| | 006 | RCD-ID-TYP | = | Char | 05 | | | 30 | 20 | Toll Free? |
| | 007 | RCD-ID-TYP | = | Char | 05 | | | 14 | 21 | Toll Free? |
| R0000007 | 001 | ENTY-CD | = | Char | MTN | | 002 | 24 | | Regulated? |
| | 002 | ENTY-CD | = | Char | MTT | | 101 | 24 | | |
| | 101 | ENTY-CD | = | Char | MBU | | 102 | 25 | | Unregulated? |
| | 102 | ENTY-CD | = | Char | MTU | | NULL | 25 | | |

ACCGP10T

| Accumulator-Gr-Id | Accumulator-Name | |
|---|---|---|
| 1 | MOUUWIAR | MOU Reg |
|   | MOUUWDDR | MOU Reg - Direct Dialed |
| 2 | MOUUWIAR | MOU Reg |
| 3 | MOUUWIAU | MOU Unreg |
|   | MOUUWDDU | MOU Unreg - Direct Dialed |
| 4 | MOUUWIAU | MOU Unreg |
| 5 | REVUWIAR | REV Reg |
|   | REVUWDDR | REV Reg - Direct Dialed |
| 6 | REVUWIAR | REV Reg |
| 7 | REVUWIAU | REV Unreg |
|   | REVUWDDU | REV Unreg - Direct Dialed |
| 8 | REVUWIAU | REV Unreg |
| 9 | MOUUWCCR | MOU Calling Card Reg |
| 10 | MOUUWCCU | MOU Calling Card Unreg |
| 11 | REVUWCCR | REV Calling Card Reg |
| 12 | REVUWCCU | REV Calling Card Unreg |
| 13 | REVPCDAT | PCS Airtime Rev |
| 14 | MOUULDDT | LD - Tot Usage MOU |
|   | MSGULDDT | LD Tot Msg Count |
|   | MOUULDTF | LD - Toll Free MOU |
| 15 | REVULDDD | LD - Direct Dialed Rev |
|   | REVULDDT | LD - Tot Usage Rev |
| 16 | REVULDCC | LD - Calling Card Rev |
|   | REVULDDT | LD - Tot Usage Rev |
|   | REVULDTF | LD - Toll Free Rev |
| 17 | REVULDDT | LD - Tot Usage Rev |
| 18 | MOUPCSAT | PCS Airtime MOU |
| 19 | MOUULDDD | LD - Direct Dialed MOU |
|   | MSGULDDT | LD Tot Msg Count |
|   | MOUULDDT | LD - Tot Usage MOU |
| 20 | MOUULDCC | LD - Calling Card MOU |
|   | MSGULDDT | LD Tot Msg Count |
|   | MOUULDDT | LD - Tot Usage MOU |
| 21 | MOUULDDT | LD - Tot Usage MOU |
|   | MSGULDDT | LD Tot Msg Count |
| 22 | MOUPCDLD | LD USWC feed MOU |
| 23 | REVPCSLD | LD USWC feed REV |
| 24 | REVUSWC | USWC REV |
|   | REVUSWCR | USWC Reg REV |
| 25 | REVUSWC | USWC REV |
|   | REVUSWCU | USWC Unreg REV |
| 26 | REVULDDD | LD - Direct Dialed Rev |
|   | REVULDTF | LD - Toll Free Rev |
|   | REVULDDT | LD - Tot Usage Rev |
| 27 | REVULDTF | LD - Toll Free Rev |
|   | REVULDDT | LD - Tot Usage Rev |
| 28 | REVULDDT | LD - Tot Usage Rev |
| 29 | MOUULDDD | LD - Direct Dialed MOU |
|   | MSGULDDT | LD Tot Msg Count |
|   | MOUULDDT | LD - Tot Usage MOU |
|   | MOUULDTF | LD - Toll Free MOU |
| 30 | MOUULDCC | LD - Calling Card MOU |
|   | MSGULDDT | LD Tot Msg Count |
|   | MOUULDDT | LD - Tot Usage MOU |
|   | MOUULDTF | LD - Toll Free MOU |

ACCUMULATION EXAMPLES

The following examples make reference to the above tables, and the critical table portions are reproduced again, below. Also, refer to the later listed record layouts for the values used in the accumulation examples below. The tables CDFLS10T (block 62) and CDEFS10T (block 64) house the logical names and displacements per record per region. These tables make this process unique in the fact a logical name is assigned to a source field. The logical name can be attached to any field within a given record across the REGION with the same meaning or content. The accumulation criteria table thus can use logical names when building its criteria and does not care about the physical aspect. The join with the CDEF10T table allow attaching the displacements into a unique record with the given logical name. This process allows for great flexibility, enhances performance, allows table updates rather than source code changes, and is a great improvement over existing systems.

Following are some simple examples showing the accumulation process:

Example 1

Region: C (Central Region)

Input Record: 210 (Direct Dialed Call Detail Record

Step 1:

The first two rows on ACCRU10T (block 70) are applicable for a 210 record in region C. Row 1 refers to field CALL-DUR (call duration) and points to accumulation rule R0000001.

| Region | Rec Id | Source Field | Accmr-Rle-Nme | Accumr-Nme | Accmr-Sto_Seq_No | Function-Name | Ruls-Eff-Dat | Ruls-Dscntn-Dat | Lst-Updt-Dat |
|---|---|---|---|---|---|---|---|---|---|
| C | 210 | Call-Dur | R0000001 | | | | 1998-02-23 | 2099-12-31 | 1998-02-23 |
| C | 210 | Msg-Chrg-Amt-Tot | R0000002 | | | | 1998-02-23 | 2099-12-31 | 1998-02-23 |

Step 2:
Table ACCCR10T is accessed for all criteria ids with a rule equal to R0000001.
 ENTY-CD=MTT
 MSG-TYP=1
 Process:
 Criteria id 001 is false, take the false compare and point to criteria id 002.
 Criteria id 002 is true, take true compare and point to criteria id 003.
 Criteria id 003 is true, and since no next criteria id, accumulation answer is group 1.

| Criteria-Id | Data-Field | Operation | Value Type | Value | True Compare | False Compare | True-Accmr-Gr-Id | False-Accmr-Gr-Id |
|---|---|---|---|---|---|---|---|---|
| 001 | ENTY-CD | = | Char | MTN | 003 | 002 | | |
| 002 | ENTY-CD | = | Char | MTT | 003 | 101 | | |
| 003 | MSG-TYP | = | Char | 1 | | | 1 | 2 |
| 101 | ENTY-CD | = | Char | MBU | 103 | 102 | | |
| 102 | ENTY-CD | = | Char | MTU | 103 | 201 | | |
| 103 | MSG-TYP | = | Char | 1 | | | 3 | 4 |
| 201 | ENTY-CD | = | Char | MTW | | | 22 | 9999 |

Step 3:
Accumulate CALL-DUR into group id 1 (ACCGP10T) list of accumulation fields. Accumulate by rules on TARAC10T (target accumulators).

| Accumulator-Gr-Id | Accumulator-Name | |
|---|---|---|
| 1 | MOUUWIAR | MOU Reg |
| | MOUUWDDR | MOU Reg - Direct Dialed |

Step 4:
Go to step 1 and repeat for all rules present on ACCRU10T.
210 Record Layout

| FIELD LEVEL/NAME | PICTURE | |
|---|---|---|
| 05 CVB-INPT-DA SYNC | GROUP | |
| 10 COM-FIX-FLD-GRP SYNC | GROUP | |
| 15 ST-CD-ADMIN | X | 2 |
| 15 BLG-NPA | 999 | 303 |
| 15 BLG-C-O-CD | 999 | 451 |
| 15 BLG-LINE-NUMB | 9(4) | 1329 |
| 15 CUST-CD | 999 | 298 |
| 15 IND-SPEC-ACCT | X | |
| 15 PRSBSCRTN-ID | X | |
| 15 ACC-CUST-NM-ABBR | XXX | MTT (ENTY-CD) |
| 15 FILLER | X | |
| 15 APRNT-BLG-NUMB-NPA | 999 | 0 |

-continued

| FIELD LEVEL/NAME | PICTURE | |
|---|---|---|
| 15 APRNT-BLG-NUMB-C-O | 999 | 0 |
| 15 APRNT-BLG-LINE-NUMB | 9(4) | 0 |
| 15 ACCOUNT-CODE | S9(5) | 0 |
| 15 REC-TYPE | 999 | 210 |
| 15 SEQ-NUMB | XX | |
| 15 IND-MS-MO | 9 | 0 |
| 15 MSG-DATE-SIR SYNC | GROUP | |
| 20 YR-ID | 9(4) | 1998 |
| 20 MO-ID | 99 | 12 |

-continued

| FIELD LEVEL/NAME | PICTURE | |
|---|---|---|
| 20 DAY-ID | 99 | 19 |
| 15 CONN-TM SYNC | GROUP | |
| 20 HR-CONN | 99 | 7 |
| 20 MN-CONN | 99 | 0 |
| 20 SEC-CONN | 99 | 0 |
| 15 IND-MS-SUM-BND | X | |
| 10 LATA-CD | 9 | 1 |
| 10 MSG-CHRG-GRSS-AMT | S9(7)V99 | 9.77 |
| 10 MSG-CHRG-GRSS-AMT-JNL-CD | S999 | 0 |
| 10 ACCT-TYPE | S999 | |
| 10 IND-RSV | 9 | 1 |
| 10 IND-PAGE-BRK | 9 | 0 |
| 10 IND-SPEC-CHAR | 9 | 0 |
| 10 IND-MULT-RATE | 9 | 0 |
| 10 IND-OVS-CALL | 9 | 0 |
| 10 IND-MULT-LINE | 9 | 0 |
| 10 IND-DIAL | 9 | 0 |
| 10 IND-SPEC-HNDL | 9 | 0 |
| 10 MSG-OTR-LN-CHRG-AMT | S9(7)V99 | 0 |
| 10 MSG-OTR-LN-CHRG-AMT-JNL-CD | S999 | 0 |
| 10 FR-OVS-PT SYNC | GROUP | |
| 15 CITY | X(8) | BRMFLD |
| 15 ST | XX | CO |
| 10 FR-NUMB-GRP-SIR SYNC | GROUP | |
| 15 NPA-LOC | 999 | 303 |
| 15 C-O-PREFIX | 999 | 451 |
| 15 ACCT-LINE-NUMB | 9(4) | 1329 |
| 15 OVFL-DIG | 99 | X'4040' |
| 10 TO-OVS-PT SYNC | GROUP | |
| 15 CITY | X(12) | ERIE |
| 15 ST | XX | CO |
| 10 TO-NUMB-GRP-SIR SYNC | GROUP | |
| 15 NPA-LOC | 999 | 303 |
| 15 C-O-PREFIX | 999 | 828 |

-continued

| FIELD LEVEL/NAME | PICTURE | |
|---|---|---|
| 15 ACCT-LINE-NUMB | 9(4) | 6096 |
| 15 OVFL-DIG | 99 | X'4040' |
| 10 IC-CAL-CD-NUMB | S9(10) | 0 |
| 10 SETTLE-CD | X | 8 |
| 10 MSG-TYPE-CD | X | 1 (MSG-TYP) |
| 10 RATE-CL | X | B |
| 10 CR-TYPE | X | |
| 10 IND-MISC-COL | X | + |
| 10 SER-NUMB | X(10) | |
| 10 CALL-DUR | SYNC | GROUP |
| 15 ELPS-MN | 9(5) | 150 |
| 15 MN-10THS | X | 0 |
| 10 FOR-ST-TAX | S9(7)V99 | 0 |
| 10 MSG-FOR-ST-TX-JNL-CD | S999 | 0 |
| 10 IC-TAX | S9(7)V99 | 0 |
| 10 IC-JRNLCD | S999 | 0 |
| 10 ITEM-NUMB-REF | S999 | 0 |
| 10 MSG-CHRG-NET-AMT | S9(7)V99 | 9.77 |
| 10 MSG-CHRG-NET-AMT-JNL-CD | S99 | 297 |
| 10 MSG-DSCNTD-CRDT-AMT | S9(7)V99 | 0 |
| 10 MSG-DSCNTD-CRDT-AMT-JNL-CD | S999 | 0 |
| 10 VOL-DSCNT-GRSS-AMT | S9(7)V99 | 0 |
| 10 VOL-DSCNT-GRSS-AMT-JNL-CD | S999 | 0 |
| 10 VOL-DSCNT-NET-AMT | S9(7)V99 | 0 |
| 10 VOL-DSCNT-NET-AMT-JNL-CD | S999 | 0 |
| 10 VOL-DSCNTD-CRDT-AMT | S9(7)V99 | 0 |
| 10 VOL-DSCNTD-CRDT-AMT-JNL-CD | S999 | 0 |
| 10 MSG-TXBLTY-INDCTN-CD | X | 0 |
| 10 ACC-PROD-SPLR-INTRNL-ID | X(7) | |
| 10 PROD-SPLR-INTRNL-ID | X(7) | CRDSVCN |
| 10 ALT-OPR-SVC-ID | X(5) | 00000 |
| 10 PRSNL-IDNTFCTN-NO-NM | X(8) | |
| 10 MSG-CHRG-PRT-AMT | S9(7)V99 | 9.77 |
| 10 MSG-OTR-LN-CHRG-PRT-AMT | S9(7)V99 | 0 |
| 10 FILLER | X | X'00' |
| 10 IND-SPL-BILL-FRMT-CD | X | |
| 10 USG-INTRNL-SER-ID 15525420095667815114 | X(20) | |
| 10 USG-INTRNL-SEQ-NO | 9(4) | 1 |
| 10 RCD-REVN-CD | X | 7 |
| 10 BLG-PROD-INTRNL-ID | X(5) | |
| 10 SRV-MARK-CD | X | |
| 10 INCL-IN-SUBTOT | X | Y |
| 10 TYP-OF-REGLTN-CD | 9 | 0 |
| 10 VOL-DSCNT-PRMTN-GRSS-JNL-CD | X | 0 |
| 10 VOL-DSCNT-PRMTN-NET-JNL-CD | X | 2 |

-continued

| FIELD LEVEL/NAME | PICTURE | |
|---|---|---|
| 10 VOL-DSCNT-PRMTN-DSCNT-JNL-CD | X | 0 |
| 10 CARR-ID | 9(04) | 0 |
| 10 SURCHRG-APPLCBL-CD | X | |
| 10 TYP-OF-CRDT-CD | 9 | 0 |
| 10 RCD-IDNTFCTN SYNC | GROUP | |
| 15 RCD-IDNTFCTN-CAT-CD | 99 | 1 |
| 15 RCD-IDNTFCTN-GR-CD | 99 | 1 |
| 15 RCD-IDNTFCTN-TYP | 99 | 1 |
| 10 SRV-TEXT-CD | X(5) | 00000 |
| 10 MISC-TEXT-CD REDEFINES SRV-TEXT-CD | | |
| 10 MISC-TEXT-CD | X(5) | 00000 |
| 10 SRV-TEXT-CD-INDR | 9 | 0 |
| 10 TO-LOCN-PHRS-INDR | 9 | 0 |
| 10 APPLCN-USG-CD | X | |
| 10 PRT-GRSS-NET-CD | X | |
| 10 FR-NO-LNGTH | 99 | X'4040' |
| 10 TO-NO-LNGTH | 99 | X'4040' |
| 10 TOT-MSG-CHRG | S9(7)V99 | 9.77 |

Example 2

Region: C (Central Region)
Input Record: B61 (Monthly service USOC record)
This process shows how a FUNCTION name can be used in the ACCRU10T (block 70) table to show another way to accumulate data.
Step 1:
The following row on ACCRU10T (block 70) is applicable for a B61 record in region C. This row is accumulating the usoc charge stored in CRB-B61-LSJRC. The Accumulation Engine recognizes that the function name is populated and calls that function dynamically.
This particular function was built specifically for usoc product records. It accumulates the specific usoc based on an entry in the Tiered product table (TIGLP11V; see below). It can accumulate the money only, keep track of the "count" of usocs of that kind, or both. The accumulation is controlled in this case by this function call. The proper logical names are used in the source code to extract the correct fields off of the input record.

| Region | Rec Id | Source Field | Accmr-Rle-Nme | Accumr-Nme | Accmr-Sto_Seq_No | Function-Name | Ruls-Eff-Dat | Ruls-Dscntn-Dat | Lst-Updt-Dat |
|---|---|---|---|---|---|---|---|---|---|
| C | B61 | CRB-B61-LSJRC | | | | Tier-Pr | 1998-02-23 | 2099-12-31 | 1998-02-23 |

B61 Record:

| | | |
|---|---|---|
| 05 CVB-INPT-DA SYNC | GROUP | |
| 10 CRB-B61-TCUST SYNC | GROUP | |
| 15 CRB-B61-TSTST | X | K |
| 15 CRB-B61-CUSID SYNC | GROUP | |
| 20 CRB-B61-NPA | XXX | 303 |
| 20 CRB-B61-CLCS SYNC | GROUP | |
| 25 CRB-B61-PHNO SYNC | GROUP | |
| 30 CRB-B61-CO | XXX | 233 |
| 30 CRB-B61-LINE | X(4) | 9254 |
| 25 CRB-B61-CUSCD | XXX | 544 |
| 25 CRB-B61-SORT | X | |
| 10 CRB-B61-RECTY | XXX | 61B (RECORD TYPE) |
| 10 CRB-B61-JEI | X | |
| 10 CRB-B61-DAEFF | XXX | X'981230' |

| | | -continued | |
|---|---|---|---|
| 10 | CRB-B61-TRMCD | X(4) | 3600 |
| 10 | CRB-B61-TXLCD | XX | |
| 10 | CRB-B61-TXEXF | X | X'80' |
| 10 | CRB-B61-TXEXS REDEFINES CRB-B61-TXEXF | | |
| 10 | CRB-B61-TXEXS | X | X'80' |
| 10 | CRB-B61-TXEXC REDEFINES CRB-B61-TXEXF | | |
| 10 | CRB-B61-TXEXC | X | X'80' |
| 10 | CRB-B61-TXEXL REDEFINES CRB-B61-TXEXF | | |
| 10 | CRB-B61-TXEXL | X | X'80' |
| 10 | CRB-B61-G REDEFINES CRB-B61-TXEXF | | |
| 10 | CRB-B61-G | X | X'80' |
| 10 | CRB-B61-JRLCD | S999 | 421 (JOURNAL-CODE) |
| 10 | CRB-B61-TX911 | X | 1 |
| 10 | CRB-B61-LL-SURCHARGE-IND | X | |
| 10 | CRB-B61-PKG | X | |
| 10 | CRB-B61-FLRA | XX | |
| 10 | CRB-B61-LSJRC | S9(9) | 1699 (CHRG-AMT) |
| 10 | CRB-B61-QUAN | S9(4) | 1 |
| 10 | CRB-B61-FLRB | XX | |
| 10 | ACC-CUST-NM-ABBR-GR SYNC | GROUP | |
| 15 | ACC-CUST-NM-ABBR | XXX | MTN (ENTY-CD) |
| 15 | FILLER | X | |
| 10 | UNIV-SRV-ORD-CD | X(5) | FQTX4 (USOC) |
| 10 | FILLER | X(4) | |

Example TIGLPL11V for Tiered Processing

| TIERED_GR_PLN_ID | TRD_GR_ACCUM_CD | UNIV_SRV_ORD_CD |
|---|---|---|
| 0 | COUNT | IFR |
| 1 | BOTH | RVM |
| 1 | BOTH | FQTX4 |
| 2 | MON | 1L5XD |
| 3 | BOTH | RAM |
| 4 | BOTH | C6BZ4 |
| 5 | BOTH | CU |
| 6 | BOTH | BUFS |

Example 3

Region: C (Central Region)
Input Record: EI (Account Master Record)

This process shows how an ACCUMULATOR name can be used to accumulate a given field DIRECTLY from the rules table. This is a third way, and very efficient way, to state what needs to be accumulated off of a given record. When the accumr name is populated, the Accumulation engine goes directly to the structure saved internal to the program and makes an update. In this case the accumulator name is TYPSRV and the value stored in UF-EI-CLSER is accumulated based on rules on the target accumulator table.

| Region | Rec Id | Source Field | Accmr-Rle-Nme | Accumr-Nme | Accmr-Sto_Seq_No | Function-Name | Ruls-Eff-Dat | Ruls-Dscntn-Dat | Lst-Updt-Dat |
|---|---|---|---|---|---|---|---|---|---|
| C | EI | UF-EI-CLSER | | TYPSRV | 85 | | 1998-02-23 | 2099-12-31 | 1998-02-23 |

Figure 3:
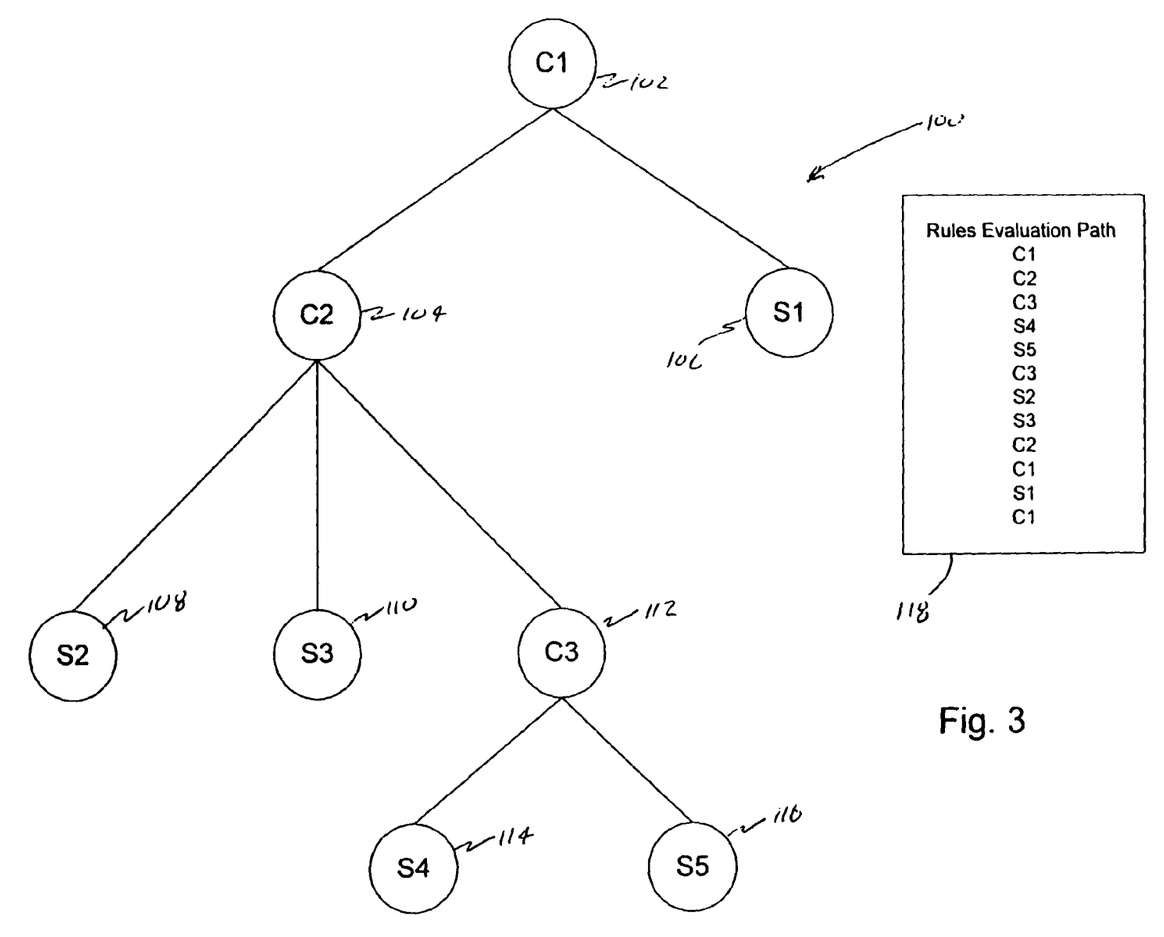
FIG. 3 depicts the evaluation path for a compound evaluation by the discount engine.
Figure 4:
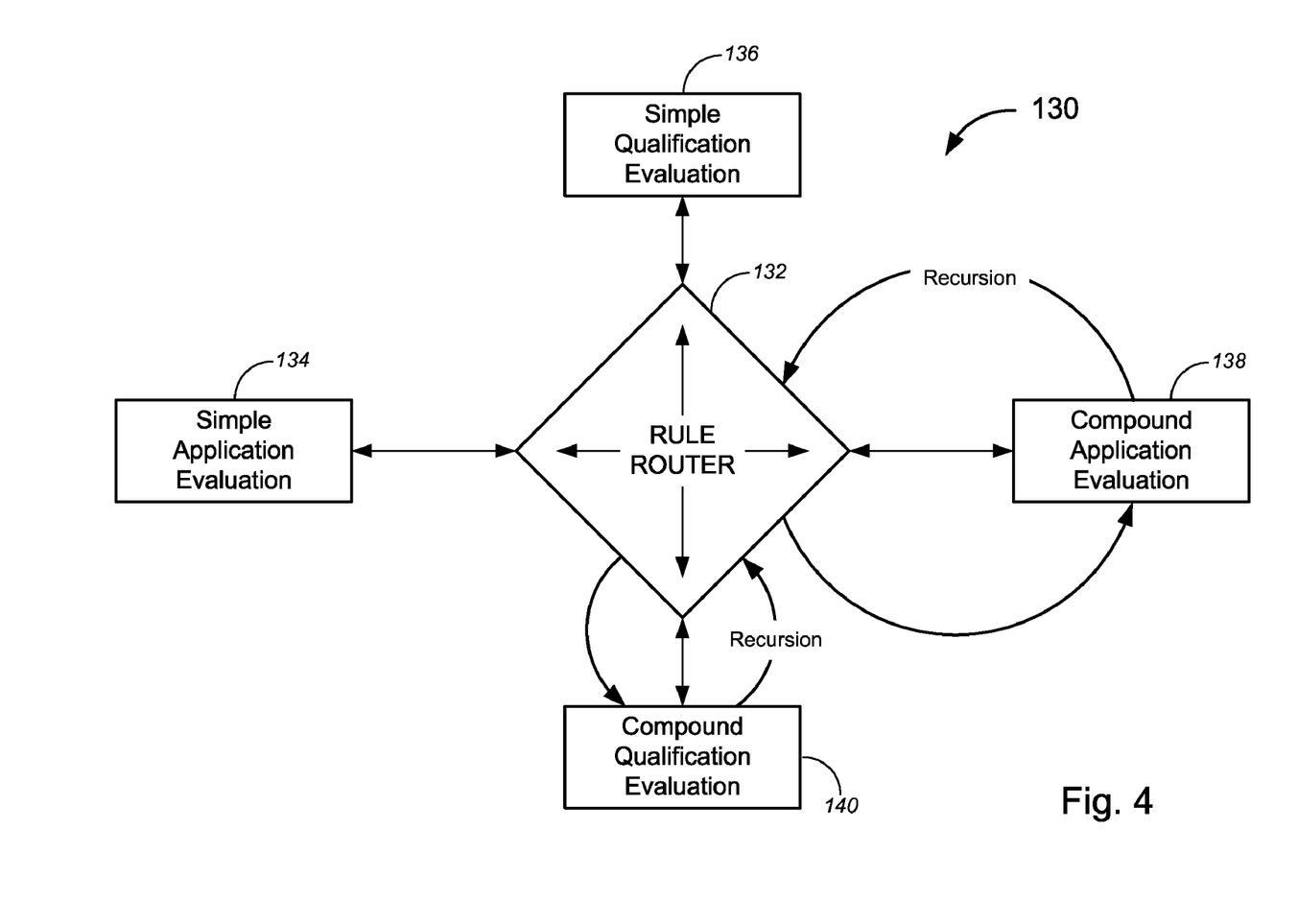
FIG. 4 illustrates the inter relations of the rules router and the application and qualification evaluations performed by the discount engine.

With reference to FIGS. 3 and 4, the discount engine performs recursive processing to apply rules by traversing a tree structure, generally indicated at 100 in FIG. 3. For example, compound rule 102 is to be evaluated. Rule 102 is formed by compound rule 104 and simple rule 106. Rule 104 is formed by rule 108, rule 110, and rule 112. Rule 112 is formed by rules 114 and 116. When performing the recursive (tree-like) evaluation of complex rule 102, the rule evaluation path is as depicted in block 118. As best shown in FIG. 4, the rule router 132 makes process calls as necessary to apply the rules. To perform qualification evaluations and application evaluations as illustrated in FIG. 3, rule router 132 of FIG. 4 calls simple application evaluation process 134, simple qualification evaluation process 136, compound application evaluation process 138, and compound qualification evaluation process 140.

Rules Tree & Evaluation Preferred Embodiment
(FIG. 3)

The CDE Discount Rules evaluation process will walk a tree structure, interpreting the compound and simple rules contained within the tree. One or more simple rules make up a compound rule. The simple rules can be grouped together with =, <, >, <=, >=, <>, ( ), )( logical operands. Compound rules are grouped together with AND & OR conditions. The process will use the Rule Router to control invocation of Simple and Compound Rules Evaluation, with recursive calls in the compound area. The Rule Router acts as a traffic cop in the interpretation of rules. Each Compound rule will either point to another Compound rule or to a Simple rule. The Simple rules ask the business questions that will be associated with a discount plan(e.g. Customer has more than $100.00 in Local Service). In order for the tree structure to be complete, the tree must end with Simple rules(the legs of the tree may not end in Compound rules). The rules evaluation process within the CDE will walk the tree structures from left to right. Each leg of the tree will be interpreted. The CDE will follow the path of walking down to the lowest level and then working its way back up to the top tree structure. The rules evaluation process will always be aware of the AND & OR conditions trying to be satisfied in the Compound rules. Should a simple rule evaluate False and the combined condition in the Compound rule require True, the rules evaluation process will stop and go up to the next level as the lower process result has already been determined.

Rule Router Preferred Embodiment (FIG. 4)

The Rule Router is unique to rules processing. Most rules evaluation processes simply invoke the rules evaluation (Simple or Compound rule)routines and then return a result. With the complexity in the CDE requirements, the Rule Router allows us to generate complex tree conditions to meet the needs of the business. Asking many questions about an account in order to render a discount, and have those questions grouped together and dependant on one another. The tree conditions may go to an unlimited depth (only limited by business requirements).

Figure 5:
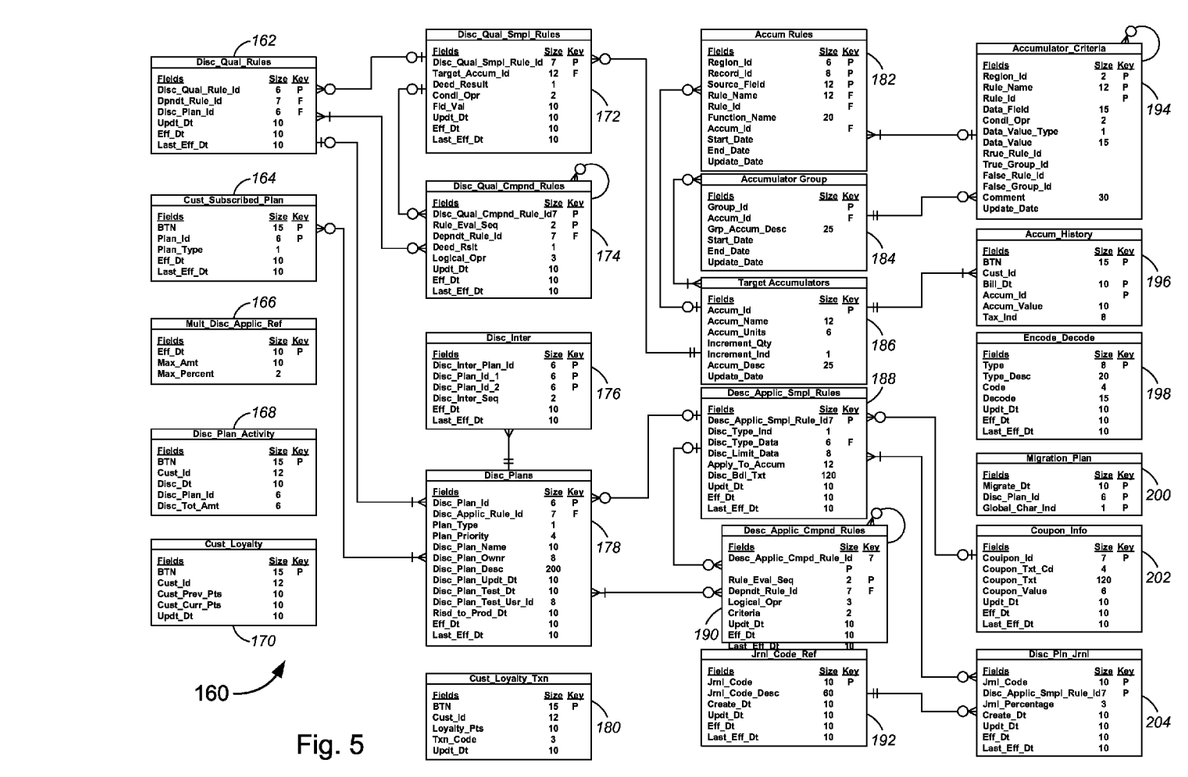
FIG. 5 illustrates a data model for the convergent discount engine of the present invention.

With reference to FIG. 5, a data model for the convergent discount engine of the present invention is generally indicated at 160. Model 160 includes various components that make up the accumulation engine and the discount engine. The blocks of model 160 are defined below.

| DEFINITIONS | |
|---|---|
| Disc_Qual_Rules (162) | Discount Qualification Rules - Linked to Discount Plans, States which rule to invoke. |
| Cust_Subscribed_Plan (164) | Table which contains the discounts plans customers have Subscribed to. |
| Mult_Disc_Applic_Ref (166) | Details how discount plan interact with one another and who has priority. |
| Disc_Plan_Activity (168) | Details the customer, the discount plan id rendered and the amount of the discount. |
| Cust_Loyalty (170) | Details the customer and the loyalty points accumulated for that customer. |
| Disc_Qual_Smpl_Rules (172) | Discount Qualification Simple Rules table. |
| Disc_Qual_Cmpnd_Rules (174) | Discount Qualification Compound Rules table. |
| Disc_Inter (176) | Discount Interaction - relates to Multi_Disc_Applic_Ref. |
| Disc_Plans (178) | Current and Past Discount Plans along with their effective Dates. |
| Cust_Loyalty_Txn (180) | Customer Loyalty Points transactions. |
| Accum_Rules (182) | Accumulation Rules table. |
| Accumulator Group (184) | Accumulator Group table. |
| Target Accumulators (186) | Target Accumulators - Current accumulators. |
| Disc_Applic_Smpl_Rules (188) | Discount Application Simple Rules table. |
| Disc_Applic_Cmpnd_Rules (190) | Discount Application Compound Rules table. |
| Jrnl_Code_Ref (192) | Journal Code Reference table - used for booking of money. |
| Accumulator_Criteria (194) | Accumulator Criteria table - listing criteria to determine if to accumulate data. |
| Accum_History (196) | Accumulator history - houses all accumulated data for all customers. |
| Encode_Decode (198) | Translation table. |
| Migration_Plan (200) | Details when migration plans where sent to production. |
| Coupon_Info (202) | Details electronic coupons available for inclusion in Discount plans. |
| Disc_Pln_Jrnl (204) | Details the relationship of discount plans to journal codes. |

Figure 6:
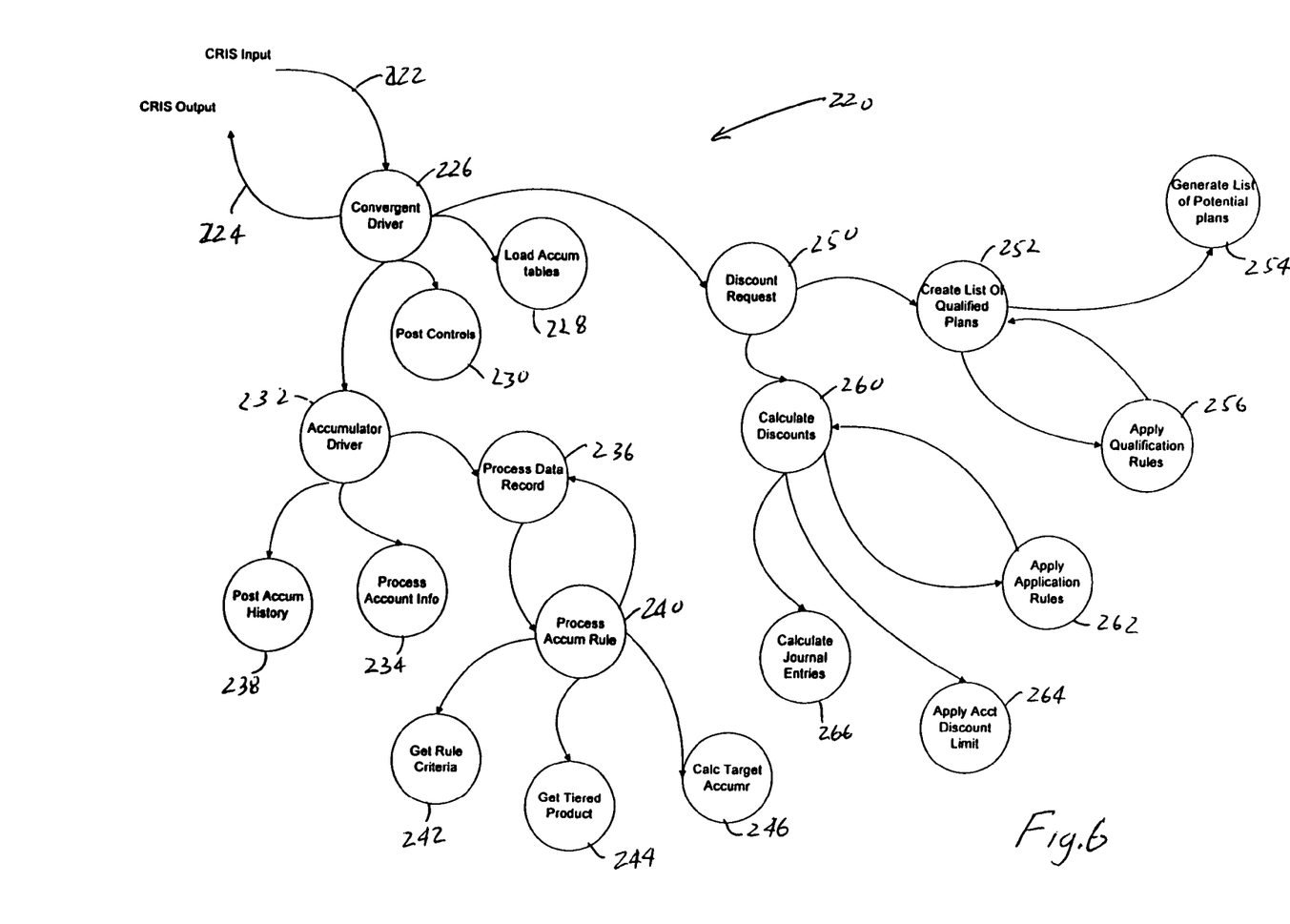
FIG. 6 illustrates logical process flow for a convergent billing performed in accordance with the present invention using a rule-based engine.

As shown in FIG. 6, the logical process flow of a suitable implementation of the present invention is generally indicated at 220. The logical process flow of FIG. 6 and the data model of FIG. 5 may be viewed together to obtain an understanding of the general process followed in a preferred implementation of the present invention, and the underlying data model used therewith. As shown in FIG. 6, input data along arrow 222 may take any form because source fields in the records are mapped to logical names for processing by convergent driver 226. Similarly, output data 224 may be presented in any format desired. Convergent driver 226, in the exemplary implementation, performs data accumulation according to accumulator tables 228 and post controls 230. Accumulator driver 232 processes account information 234 and data records 236. The processing of the data records is performed as previously described, at process 240.

As mentioned previously, a rules table implementation may provide several different ways of processing a data record such as rule criteria base processing 242, tiered product processing 244, or direct placement into a tiered accumulator 246. On the other side of convergent driver 226 is the discount engine with the flow beginning at discount request 250. At 252, discount qualification takes place, with a list of potential plans being generated at 254 and qualification rules being applied at 256. Discounts are caluclated or rendered at 260 by applying application rules 262 as described previously. Thereafter, any discount limits are applied at 264, and journal entries are calculated at 266.

Figure 7:
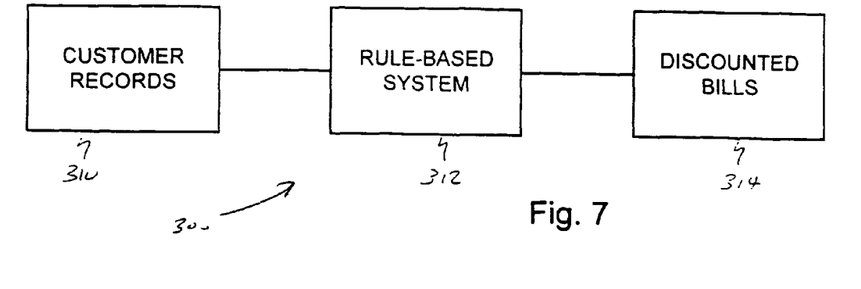
FIG. 7 is a block diagram illustrating a system of the present invention using a rule-based system to render discounts by processing customer records.

Although a particular implementation of the present invention has been described, along with preferred features for the rule-based system such as the use of a straight-through accumulator engine and a recursive discount rendering engine, embodiments of the present invention may be implemented in a variety of different ways other than that specific example described above. As best shown in FIG. 7, a system of the present invention is generally indicated at 300. In the broad representation of the present invention shown in FIG. 7, customer records are received in any format at 310, preferably, with logical names being assigned to source fields. A rule-based system 312 processes the data. In a preferred implementation, the rule-based system includes a discount rules evaluation engine and a data accumulation rules engine. Of course, in some implementations, all of the functions may not be performed by the rule-based system. Preferably, a combination of percentage, flat, tiered, threshold, waived discounts along with loyalty points and electronic coupons may be processed by rule-based system 312. Thereafter, at block 314, discounted bills are generated. Advantageously, embodiments of the present invention provide the ability to look at differing data across company affiliates (for example, in telecommunications industry implementation, local, wireless, carrier, long distance, etc.), and billing environments, and bring it all together and use it in convergent discounts.

Figures 8, 9:
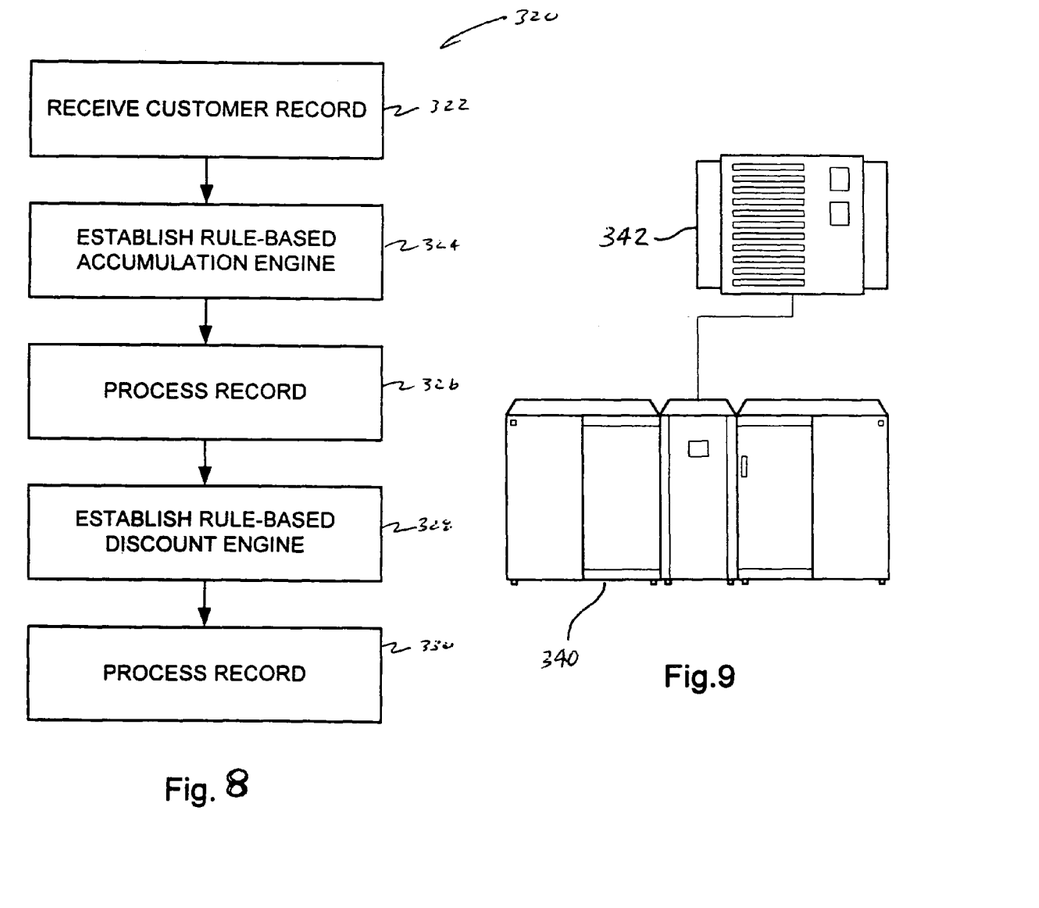
FIG. 8 is a block diagram illustrating a method of the present invention utilizing a rule-based accumulation engine and a rule-based discount engine.
FIG. 9 is an exemplary computer capable of reading storage media, with exemplary computer readable storage media also being illustrated.

In FIG. 8, a preferred method for implementing system 300 is generally indicated at 320. At block 322, customer records are received. At block 324, a rule-based accumulation engine is established. At block 326, records are processed with the accumulation engine to accumulate the data in a plurality of predetermined target accumulators. At block 328, a rule-based discount engine is established. At block 330, the plurality of target accumulators are processed with the discount engine to render discounts applicable to the customer.

It is appreciated, that embodiments of the present invention may be implemented as software in a computer readable storage medium. The computer readable storage medium may take any form. For example, magnetic or optical media may be used to store instructions, executable by a computer for managing information and rendering discounts in accordance with the present invention. As shown in FIG. 9, a mainframe is generally indicated at 340. Control logic within mainframe 340 processes the instructions and data to implement the present invention. The instructions and data may be stored in any type of computer readable media such as a disk array 342 and memory at mainframe 340.

It is to be appreciated that the present invention, for the very first time, uses a rule-based system to manage customer information and render billing discounts. Advantageously, a rule-based system greatly expands billing system capabilities compared to existing application specific software packages. The present invention allows a system administrator to dynamically define how to accumulate billed infromation items, apply discount rules (in IF THEN ELSE logic patterns) to generate threshold, tiered, flat, percentage discounts, as well as loyalty points and electronic coupons. The invention provides the capability to combine billed charges from different sources and affiliates, interrogate those charges, and apply discounts based on these charges.

In summary, a preferred embodiment for a particular application, which the inventors found to be useful and to be a suitable exemplary implementation, has three main components:

1. Billed Information/Item Accumulation

This portion of the engine is rule-based, allows the business to define what items (facts) they would like to know about a customer and the charges that customer has incurred. Being that it is rule-based and externalized, changes can be quickly made to the type of data to be accumulated. Note—based on the definition of these accumulators, the discount engine gains additional capabilities (e.g., if you define where a customer resides, the engine can calculate geography based discounts, if you define how long a customer has been with the company, the engine can calculate tenure based discounts, etc.)

The accumulator engine portion of CD was developed to be a rule-based engine that was to process many accumulator transactions. These transactions or record identifiers were housed in an accumulator rule table that was to drive the accumulation process due to the volume of transactions, a method was used to design the internal structures to facilitate quick access to accumulation data and/or criteria. The process that was designed used a concept of an internal storage sequence number that was able to allow the software to directly look up the information and greatly improve performance. Another key component included multiple data displacement tables that allowed us to externalize data displacements in regard to accumulator transactions, which enabled us the ability to respond to a business change more quickly by external table updates versus hard-coded software enhancements.

2. Discount Qualification

This portion of the engine is also rule-based, it allows the business to define what conditions must be present in order to render a discount. The rules are based on if then else structures so they can be understood by a non-technical individual.

3. Discount Rendering

This portion of the engine is rule-based as well, it applies the rules for rendering a discount. The rules are based on if then else structures so they can be understood by a non-technical individual.

The following applies to both discount qualification and rendering rules:

Rules are categorized into two parts—simple rules (ability to ask simple questions, $X = Y$, etc. using $+, <, >, <>, (\ ), )($ logical operators) and compound rules (ability to group simple rules together using AND & OR logic). Rules processing allows you to define any depth to the simple and compound rules using a modified b-tree structure. The rules engine is constructed to process each logical leg of the rules tree and then based on evaluated conditions exit the structure or continue processing the remaining leg—this allows for efficient processing.

Overall Concept:

The overall engine concept was constructed to allow the business to quickly act and re-act in an ever changing competitive environment. The engine was designed for maximum flexibility and to allow the business to build their own rules without technical intervention using the technical structures depicted above.

Business Capabilities:

The CDE was designed and has the ability to perform the following: auto qualification of discount plans, subscription based discount plans, bundling and package discounting, location discounting, flat dollar based discounts, percentage based discounts, tiered discounting, tenure discounting, threshold discounting for usage and non-usage items, prepay discounts, average based discounting, accumulated spending discounting, long term (more than one month) discounting, date, day and time of week discounting, geography based discounting, contract discounting, affinity discounting, tethering, customer referral discounting, loyalty point processing, electronic couponing, revenue and financial tracking and management, and journaling of discounts and management of bookings.

While the best mode for carrying out the invention has been described in detail, those familiar with the art to which this invention relates will recognize various alternative designs and embodiments for practicing the invention as defined by the following claims.

What is claimed is:

1. A method for managing information and rendering discounts in a billing system, the method comprising:
   receiving, at a computer system, a customer record including data wherein the record has a record type;
   processing the record with a rule-based accumulation engine at the computer system to accumulate the data in a plurality of predetermined target accumulators;
   establishing a rule-based discount engine to allow a user to define at least one compound rule for applying discounts to the customer, the at least one compound rule grouping together at least two or more simple rules in a tree structure with logical operands, each simple rule representing a criterion for applying discounts;
   processing the plurality of target accumulators with the discount engine at the computer system to render discounts applicable to the customer, wherein processing the plurality of target accumulators comprises evaluating the at least one compound rule with a rule router, the rule router recursively evaluating the compound rule by evaluating each of the one or more simple rules in the tree structure; and
   generating, with the computer system, one or more discounted bills in accordance with the rendered discounts.

2. The method of claim 1 wherein establishing the accumulation engine further comprises:
   establishing at least one function for processing a record, wherein a rules table directs the accumulation engine to apply the at least one function when dictated by the record type.

3. The method of claim 1 wherein the record includes at least one source field, and wherein receiving the record further comprises:
   assigning a logical name to a source field, wherein the accumulation engine processes the record using the logical name.

4. The method of claim 1 wherein establishing the discount engine further comprises:
   establishing at least one rule for processing the record to evaluate discount qualification; and
   establishing at least one rule for processing the record to evaluate discount application.

5. The method of claim 1 wherein establishing the discount engine further comprises:
   establishing at least one simple rule for processing the record.

6. The method of claim 5 wherein establishing the discount engine further comprises:
   establishing at least one compound rule for processing the record, the at least one compound rule being composed of a plurality of simple rules, wherein the discount engine applies a compound rule by recursively applying simple rules.

7. A computer readable storage medium having information stored thereon representing instructions executable by a computer to manage information and render discounts in a billing system, the computer readable storage medium further comprising:
   instructions for receiving a customer record including data wherein the record has a record type;
   instructions for processing the record with a rule-based accumulation engine to accumulate the data in a plurality of predetermined target accumulators;
   instructions for establishing a rule-based discount engine to allow a user to define at least one compound rule for applying discounts to the customer, the at least one compound rule grouping together at least two or more simple rules in a tree structure with logical operands, each simple rule representing a criterion for applying discounts;
   instructions for processing the plurality of target accumulators with the discount engine to render discounts applicable to the customer, wherein processing the plurality of target accumulators comprises evaluating the at least one compound rule with a rule router, the rule router recursively evaluating the compound rule by evaluating each of the one or more simple rules in the tree structure; and
   instructions for generating one or more discounted bills in accordance with the rendered discounts.

8. The medium of claim 7 further comprising:
   instructions for establishing at least one function for processing a record, wherein a rules table directs the accumulation engine to apply the at least one function when dictated by the record type.

9. The medium of claim 7 wherein the record includes at least one source field, and wherein the medium further comprises:
   instructions for assigning a logical name to a source field, wherein the accumulation engine processes the record using the logical name.

10. The medium of claim 7 further comprising:
    instructions for establishing at least one rule for processing the record to evaluate discount qualification; and
    instructions for establishing at least one rule for processing the record to evaluate discount application.

11. The medium of claim 7 further comprising:
    instructions for establishing at least one simple rule for processing the record.

12. The medium of claim 11 further comprising:
    instructions for establishing at least one compound rule for processing the record, the at least one compound rule being composed of a plurality of simple rules, wherein the discount engine applies a compound rule by recursively applying simple rules.

13. A computer billing system for managing information and rendering discounts, the computer system comprising:
    control logic for processing a set of instructions executable by the computer billing system; and
    a computer readable medium storing the set of instructions, the set of instructions comprising:
      instructions for receiving a customer record including data wherein the record has a record type;
      instructions for processing the record with a rule-based accumulation engine to accumulate the data in a plurality of predetermined target accumulators;
      instructions for establishing a rule-based discount engine to allow a user to define at least one compound rule for applying discounts to the customer, the at least one compound rule grouping together at least two or more simple rules in a tree structure with logical operands, each simple rule representing a criterion for applying discounts;
      instructions for processing the plurality of target accumulators with the discount engine to render discounts applicable to the customer, wherein processing the plurality of target accumulators comprises evaluating the at least one compound rule with a rule router, the rule router recursively evaluating the compound rule by evaluating each of the one or more simple rules in the tree structure; and
      instructions for generating one or more discounted bills in accordance with the rendered discounts.

* * * * *